(12) United States Patent
Ravindran et al.

(10) Patent No.: US 10,757,213 B2
(45) Date of Patent: Aug. 25, 2020

(54) METHOD AND APPARATUS FOR PUSHING DATA IN A CONTENT-CENTRIC NETWORKING (CCN) NETWORK

(71) Applicant: Futurewei Technologies, Inc., Plano, TX (US)

(72) Inventors: Ravishankar Ravindran, San Ramon, CA (US); Guo-qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 446 days.

(21) Appl. No.: 14/826,785

(22) Filed: Aug. 14, 2015

(65) Prior Publication Data
US 2017/0048346 A1   Feb. 16, 2017

(51) Int. Cl.
*H04L 29/08* (2006.01)
*H04L 29/06* (2006.01)
*H04N 21/20* (2011.01)

(52) U.S. Cl.
CPC ...... *H04L 67/2842* (2013.01); *H04L 65/4061* (2013.01); *H04L 65/4084* (2013.01);
(Continued)

(58) Field of Classification Search
CPC ....... H04L 69/22; H04L 45/306; H04L 45/38; H04L 45/566; H04L 63/10;
(Continued)

(56) References Cited

U.S. PATENT DOCUMENTS 6,321,300 B1 * 11/2001 Ornes ............... G06F 12/0804
                                                      711/135
7,526,297 B1 *  4/2009 Holur ................... H04L 67/26
                                                      455/466
(Continued)

FOREIGN PATENT DOCUMENTS

CN   101820386 A   9/2010
CN   103747083 A   4/2014
(Continued)

OTHER PUBLICATIONS

Ravindran et al.; Support for Notifications in CCN; Jul. 6, 2015; ICN Research Group; pp. 1-9.*
(Continued)

*Primary Examiner* — Tonia L Dollinger
*Assistant Examiner* — Linh T. Nguyen
(74) *Attorney, Agent, or Firm* — Vierra Magen Marcus LLP

(57) ABSTRACT

A method for pushing data in a Content-Centric Networking (CCN) network comprises receiving a message from a source at an input interface device of a node device in the CCN network, the node device executing a CCN protocol. A determination is made that the received message is an interest-notification message. The received message is identified as the interest-notification message by including a Type field, a Content Name field, and a Cacheable Object field. The Type field indicates that the received message is pushing data within the CCN network. The Content Name field associates a hierarchical name to the data being pushed within the CCN network. The Cacheable Object field includes a cacheable object representing the data being pushed within the CCN network. The cacheable object is extracted in response to the received message being an
(Continued)

interest-notification message. The cacheable object is placed in a cache at the node device.

21 Claims, 9 Drawing Sheets

(52) U.S. Cl.
CPC .......... *H04L 67/327* (2013.01); *H04N 21/20* (2013.01); *H04L 67/1097* (2013.01)

(58) Field of Classification Search
CPC . H04L 49/3009; H04L 63/0245; H04L 47/35; H04L 67/327; H04L 67/2842; H04L 67/1097; H04L 63/123; H04L 45/7457; H04L 61/303; H04N 21/23106
USPC ....... 709/238, 203, 219, 232, 236, 206, 204; 370/392, 235, 295
See application file for complete search history.

(56) References Cited

U.S. PATENT DOCUMENTS

| | | | |
|---|---|---|---|
| 8,204,060 B2* | 6/2012 | Jacobson | H04L 45/00 370/392 |
| 9,015,273 B2 | 4/2015 | Park et al. | |
| 9,621,671 B2* | 4/2017 | Kim | H04L 67/327 |
| 9,836,540 B2* | 12/2017 | Mosko | G06F 17/30864 |
| 9,959,156 B2* | 5/2018 | Mosko | G06F 11/0784 |
| 2010/0195655 A1* | 8/2010 | Jacobson | H04L 45/00 370/392 |
| 2011/0161442 A1* | 6/2011 | Bouazizi | H04H 20/93 709/206 |
| 2013/0060962 A1* | 3/2013 | Wang | H04L 67/327 709/238 |
| 2015/0012658 A1 | 1/2015 | Elmore | |
| 2015/0117253 A1* | 4/2015 | Scott | H04L 45/306 370/254 |
| 2015/0120895 A1* | 4/2015 | Solis | H04L 45/74 709/223 |
| 2015/0120924 A1* | 4/2015 | Scott | H04L 69/22 709/225 |
| 2015/0127852 A1* | 5/2015 | Prieditis | H04L 67/2842 709/242 |
| 2016/0014027 A1* | 1/2016 | Oran | H04L 45/742 709/213 |
| 2016/0043940 A1* | 2/2016 | Mahadevan | H04L 45/566 709/223 |
| 2016/0050068 A1* | 2/2016 | Mahadevan | H04L 9/321 713/155 |
| 2016/0065685 A1* | 3/2016 | Kurihara | H04L 1/08 714/748 |
| 2016/0105524 A1* | 4/2016 | Farhadi | H04L 67/2842 370/412 |
| 2016/0285671 A1* | 9/2016 | Rangarajan | H04L 67/327 |
| 2017/0134276 A1* | 5/2017 | White | H04L 45/742 |

FOREIGN PATENT DOCUMENTS

| | | |
|---|---|---|
| CN | 103765832 A | 4/2014 |
| CN | 104115472 A | 10/2014 |
| CN | 104468704 A | 3/2015 |
| EP | 2813058 A1 | 12/2014 |
| EP | 2869537 A1 | 5/2015 |
| WO | 2013029569 A1 | 3/2013 |

OTHER PUBLICATIONS

Barakabitze et al., Caching and Data Routing in Information Centric Networking (ICN): The Future Internet Perspective, Nov. 2014, International Journal of Advanced Research in Computer Science and Software Engineering, vol. 4, Issue 11, pp. 1-13 (Year: 2014).*
Ghali et al. Interest-Based Access Control for Content Centric Networks (extended version), May 23, 2015, pp. 1-10 (Year: 2015).*
International Search Report dated Oct. 28, 2016 in International Patent Application No. PCT/CN2016/094638, 4 pages.
R. Ravindran et al. Support for Notifications in CCN, draft-ravi-icnrg-ccn-notification-00, ICN Research Group, Jul. 7, 2016. total 18 pages.
Office Action dated Jul. 2, 2019, in Chinese Patent Application No. 201680046967.0, 6 pages.
Search Report dated Jun. 20, 2019, in Chinese Patent Application No. 201680046967.0, 2 pages.
XP058093199 Van Jacobson et al., "Networking named content", Conext '09 Proceedings of the 5th International Conference on Emerging Networking Experiments and Technologies, Dec. 1, 2009, total 12 pages.
European Search Report, 16836598.9, dated May 29, 2018.

* cited by examiner

| Type (Interest) | Content Name | Selector Elements | Nonce | / 500 |

| Type (Interest Notification) | Content Name | Cacheable Object | Security Metadata |

| Type (Interest Notification) | Interest Message 500 | Content Name | Cacheable Object | Security Metadata |

| Type (Interest Notification) | Content Object | Content Name | Cacheable Object | Security Metadata |

FIG. 6C

METHOD AND APPARATUS FOR PUSHING DATA IN A CONTENT-CENTRIC NETWORKING (CCN) NETWORK

TECHNICAL FILED

The present disclosure relates in general to information centric networking and more particularly to a method and apparatus for pushing data in a Content-Centric Networking (CCN) network.

BACKGROUND

Advanced low-cost wireless technologies have enabled a huge variety of real life applications in the past years. Wireless sensor technologies have emerged in almost every application field imaginable. Smartphones equipped with Internet connectivity and home electronics with networking capability have made their way to everyday life. The Internet of Things (IoT) is a novel paradigm that has risen to frame the idea of a large scale sensing ecosystem, in which all possible devices could contribute. The definition of a thing in this context is very vague. It can be anything from passive RFID tags on retail packaging to intelligent transducers observing the surrounding world. The amount of connected devices in such a worldwide sensing network would be enormous. This is ultimately challenging for the current Internet architecture which is several decades old and is based on host-to-host connectivity.

The current Internet addresses content by location. It is based on point-to-point connections, which eventually means that every connected device has to be uniquely addressable through a hostname or an IP address. This paradigm was originally designed for sharing resources rather than data. Today the majority of Internet usage consists of sharing data, which is not what it was originally designed for. Various patchy improvements have come and gone, but a thorough architectural redesign is required. Information-Centric Networking (ICN) is a new networking paradigm that addresses content by name instead of location. Its goal is to replace the current content by location Several ICN architecture proposals have emerged from the research community, out of which Content-Centric Networking (CCN) is the most significant. However, CCN is a data pull based architecture and is not conducive to a typical IoT data push application.

SUMMARY

From the foregoing, it may be appreciated by those skilled in the art that a need has arisen to implement IoT applications using a CCN protocol. In accordance with the present disclosure, a new type of CCN message primitive called interest-notification is proposed that is processed differently from current packet primitives, and a method and apparatus for pushing data in a Content-Centric Networking (CCN) network is provided that greatly reduces and substantially eliminates the problems associated with conventional information-centric networking techniques.

In accordance with one embodiment, a method for pushing data in a Content-Centric Networking (CCN) network is provided that includes receiving a message from a source at an input interface device of a node device in the CCN network, the node device executing a CCN protocol. A determination is made that the received message is an interest-notification message. The received message is identified as the interest-notification message by including a Type field, a Content Name field, and a Cacheable Object field. The Type field indicates that the received message is pushing data within the CCN network. The Content Name field associates a hierarchical name to the data being pushed within the CCN network. The Cacheable Object field includes a cacheable object representing the data being pushed within the CCN network. The cacheable object is extracted in response to the received message being an interest-notification message. The cacheable object is placed in a cache at the node device.

The present disclosure describes many technical advantages over conventional information-centric networking techniques. For example, one technical advantage is to use the CCN protocol to push data in a network. Another technical advantage is to establish a CCN message format for pushing data in the network. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 5 illustrates an example format for an Interest message;

FIGS. 6A-6C illustrate an example formats for a special type of Interest Message including a cacheable object;

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

Figure 1:
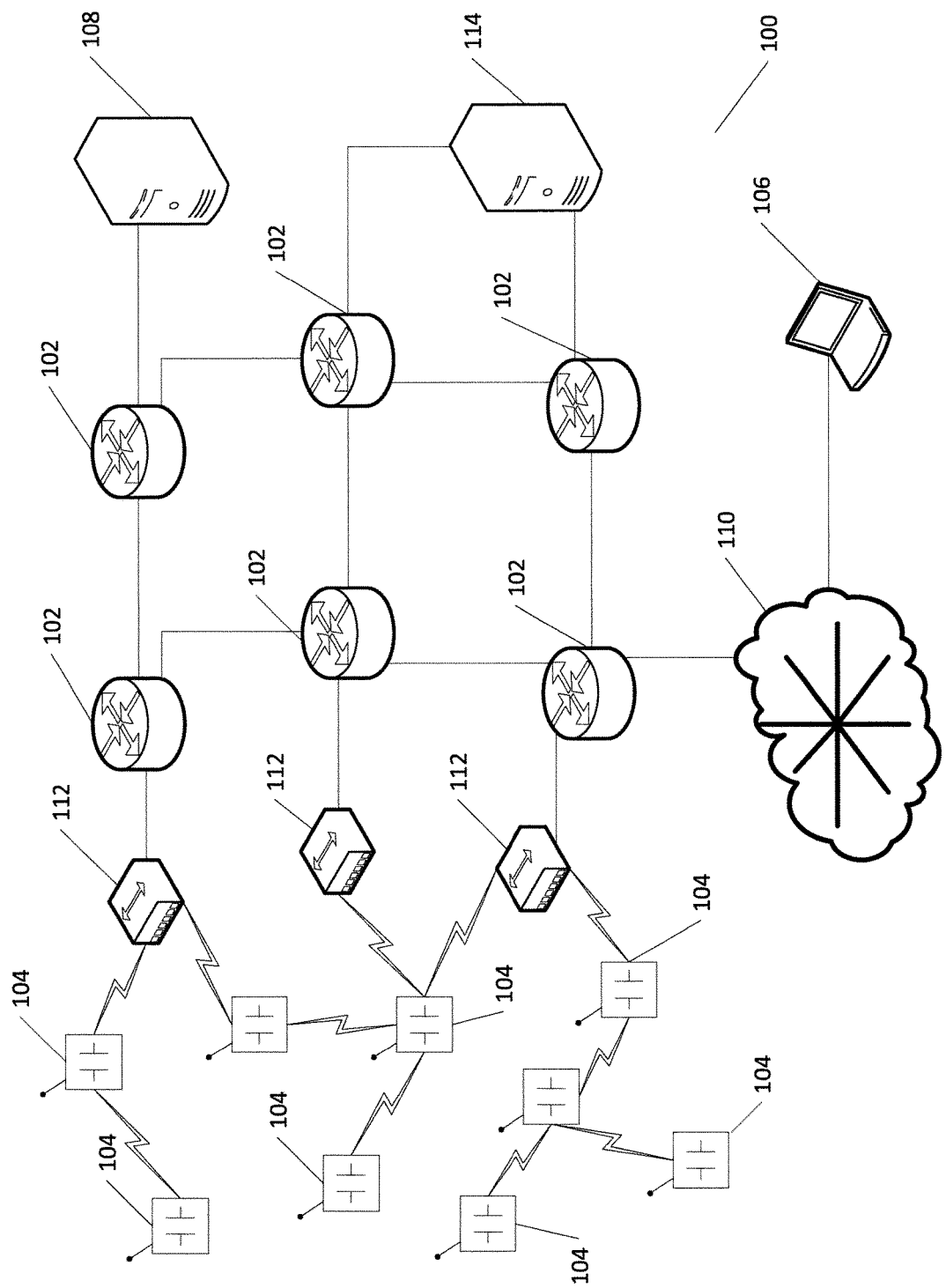
FIG. 1 illustrates a network diagram implementing a Content-Centric Networking (CCN) protocol.

FIG. 1 shows a simplified diagram of a network 100 implementing CCN concepts. Network 100 includes CCN node devices 102. Network 100 may also include other entities and devices such as sensors 104, clients 106 with Internet 110 access, IoT servers 108, sink elements 112, and at least one application server 114 that includes the functionality of a CCN node device 102. Other examples for a CCN node device 102 include access points, gateways, content routers, edge/service/core routers, domain controllers (AS) 140, and one or more content repositories. Each entity may also include a capability to cache data. Network 100 may include other components using the CCN protocol to communicate and these components may run various applications with an ability to provide and request data. CCN node device 102 is a network entity that implements forwarding and buffering. CCN node device 102 uses a transport protocol built on named data irrespective of the identities or locations of machines involved. CCN has no notion of host at its lowest level. A packet "address" names content, device, or service, but not location. The CCN protocol efficiently delivers named content rather than connecting hosts to other hosts. Every packet of data may be cached at any CCN node device 102. Combined with intrinsic support for multicast or broadcast delivery, this leads to a very efficient use of the network when many people are interested in the same content.

The CCN protocol provides location-independent delivery services for named data packets. The services include multi-hop forwarding for end-to-end delivery, flow control, transparent and automatic multicast delivery using buffer storage available in the network, loop-free multipath forwarding, verification of content integrity regardless of delivery path, and carriage of arbitrary application data. Applications run the CCN protocol over some lower-layer communications service capable of transmitting packets. There are no restrictions on the nature of the lower-layer service: it may be a physical transport or another network or transport protocol. For example, applications will typically run the CCN protocol on top of UDP to take advantage of existing IP connectivity. Since content is named independent of location in the CCN protocol, it may also be preserved indefinitely in the network, providing effectively a form of distributed file system service.

The CCN protocol supports a wide range of network applications. The CCN model supports stored content applications such as distribution of video or document files. The CCN model also supports real-time communication and discovery protocols and can carry conversations between hosts such as TCP connections. The protocol supports a broad range of applications by leaving the choice of naming conventions to the application. The CCN protocol is designed for end-to-end communication between applications and so it is intended to be integrated into application processing rather than being implemented as a separate layer.

The CCN protocol emphasizes content by making it directly addressable and routable. Endpoints communicate based on named data instead of IP addresses. CCN is characterized by the basic exchange of content request messages (called "Interests") and content return messages (called "Content Objects"). The Interest message is used to request data by name. An Interest message can identify a chunk of content to retrieve very specifically. Alternatively, an Interest message can provide a name prefix and other qualifications to restrict what data is acceptable from the collection named by the prefix.

A CCN name sometimes identifies a specific chunk of data, but in other cases identifies a collection of data by naming a point in the name tree under which there may be multiple pieces of data. A name identifying a collection of data is analogous to the address of a network in the host addressing scheme of IP, where the network address can be seen to identify the collection of hosts attached to that network. In the case of naming a collection, the CCN name is a prefix of the name of every piece of content in the collection, just as an IPv4 network address gives a prefix of the IP addresses of member hosts. For this reason, a CCN name may be referred to as a name prefix or simply prefix.

The Content Object is used to supply data. A Content Object message not only contains a data payload but the identifying name (without the implicit digest component), a cryptographic signature, and identification of the signer (called the publisher) along with other information about the signing. Formally, a Content Object message is an immutable binding of a name, a publisher, and a chunk of data. Every Content Object message is required to contain a valid signature. In this way, all data communicated with the CCN protocol is attested.

Any CCN party may choose to verify the signature on any Content Object message that it receives. Applications that are going to make use of the data must verify the data first. Verification may require public keys, which are not included in the Content Object message, to be verified. A CCN party discards a Content Object message that fails to verify.

Communication using the CCN protocol is receiver-controlled. A consumer of data transmits an Interest message over available connectivity and any party receiving the message and having data that matches, or satisfies, the request (according to the specifications in the Interest Message) may transmit a matching Content Object message. Data is only transmitted in response to an Interest that matches the Data. An Interest message may be transmitted using broadcast or multicast facilities of the underlying transport in order to reach many potential sources of data with minimal bandwidth cost.

A party transmits at most one Content Object message in response to a single received Interest message, even if the party has many Content Objects that match. This one-for-one mapping between Interest and Data messages maintains allow balance that allows the receiver to control the rate at which data is transmitted from a sender, and avoids consuming bandwidth to send data anywhere it is not wanted.

Node devices implement suppression mechanisms to minimize the potential for two different node devices to transmit two Content Object messages in response to a single Interest received by both node devices (for example via broadcast or multicast). The suppression mechanisms include randomizing response times and detecting the fact that another node device has broadcast or multicast a response so the Interest may be discarded.

A receiver that desires to retrieve a large collection of data requiring multiple Content Object messages transmits a sequence of Interest messages. For pipelining, a receiver may transmit multiple Interest messages without waiting for data in response to each one before sending the next. This is only possible if the receiver knows enough about the names of the Content Objects to construct different Interests in advance. Sending multiple Interest messages with identical requests will usually cause the same Content Object to be transmitted repeatedly, since senders respond to Interests based only on what content they have available at the time, and not on any memory of what Content Objects they have previously transmitted.

The CCN protocol does not assume that underlying transport of messages is reliable. To provide reliable delivery, Interest messages that are not satisfied in some reasonable period of time are retransmitted. A receiver maintains a timer on unsatisfied Interests for which it still wants the data and retransmits them when the timer expires.

Figure 2:
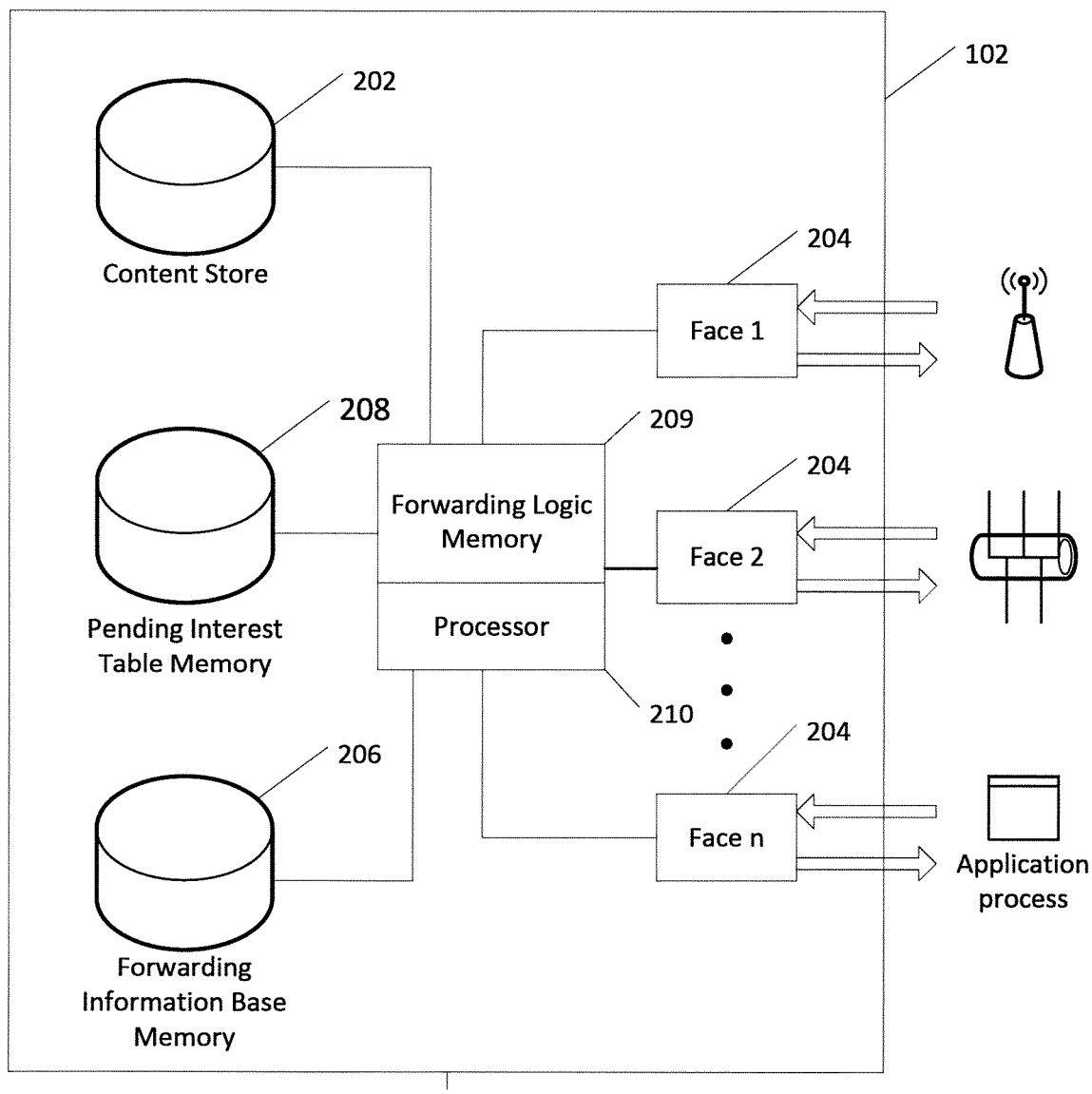
FIG. 2 illustrates a simplified block diagram of a CCN node device.

FIG. 2 shows an example of a CCN node device 102. A full CCN node device (as opposed to a limited CCN party such as a single application) contains the following data structures to provide buffering/caching and loop-free forwarding. CCN node device 102 includes a Content Store (CS) 202, one or more network interface devices (Faces) 204, a Forwarding Information Base (FIB) memory 206, a Pending Interest Table (PIT) memory 208, and Forwarding Logic memory 209, and a processor 210. CS 202 has a buffer memory organized for retrieval of Content Objects by prefix match lookup on names. Since CCN Content Object messages are self-identifying and self-authenticating, each one is potentially useful to many consumers. CS 202 implements a replacement policy that maximizes the possibility of reuse such as Least Recently Used (LRU) or Least Frequently Used (LFU). CS 202 also implements a staleness bit. CS 202 may retain Content Object messages indefinitely but is not required to take any special measures to preserve them. Each CS 202 associates a staleness bit with every Content Object.

The initial setting of the staleness bit for newly-arrived content is "not stale". A Content Object that has the staleness bit set is not eligible to be sent in response to an Interest Message unless the Interest has an "answer may be stale" bit set. The effect is the same as if that stale Content Object did not exist (i.e., the Interest might be matched by some other Content Object in the store, or, failing that, get forward to other node devices). If an exact duplicate of a stale Content Object arrives, the effect is the same as if the stale Content Object had not been present. In particular, the Content Object in the store is no longer stale. As a practical matter, a stale Content Object should be ranked high on the list of things to discard from the store when a storage quota has been reached.

There are at least two ways for the staleness bit to be set: explicitly or by a timer. To set the staleness bit explicitly, a local client may express an interest for the content client with the "Mark as stale" bit set in the Interest message. This is restricted to local clients to limit the scope of attacks that might seek to make content inaccessible. To set the staleness bit by a timer, the Content Object may include a Freshness element. The per-object staleness timer is local to the CCN node device and starts when the Content Object arrives. The Content Object becomes stale when the specified number of seconds has expired.

Face 204 is a generalization of the concept of an interface. Face 204 may be a connection to a network or directly to an application party. Face 204 may be configured to send and receive broadcast or multicast packets on a particular network interface, or to send and receive packets using point-to-point addressing in the underlying transport, or using a tunnel (for example a TCP tunnel). Face 204 may also be the connection to a single application process running on the same machine, via an encapsulation like UDP or an OS-specific inter-process communication path. All messages arrive through a face and are sent out through a face.

FIB memory 206 provides a table of outbound faces for Interests, organized for retrieval by longest prefix match lookup on names. Each prefix entry in FIB memory 206 may point to a list of Faces 204 rather than only one.

PIT memory 208 is a table of sources for unsatisfied Interests, organized for retrieval by longest prefix match lookup on names. Each entry in PIT memory 208 may point to a list of sources. Entries in PIT memory 208 time out rather than being held indefinitely.

Processor 210 interfaces with CS 202, PIT memory 208, FIB memory 206, and Faces 204 to process Interest and Content Object messages as described below. Forwarding Logic memory 209 provides the execution instructions for processor 210.

Note that the tables listed above may be interconnected through a single index to minimize the cost of lookup operations at the core of CCN message processing and forwarding. Such an index is ordered or prioritized to achieve the effect of the lookup order specified below.

Figure 3:
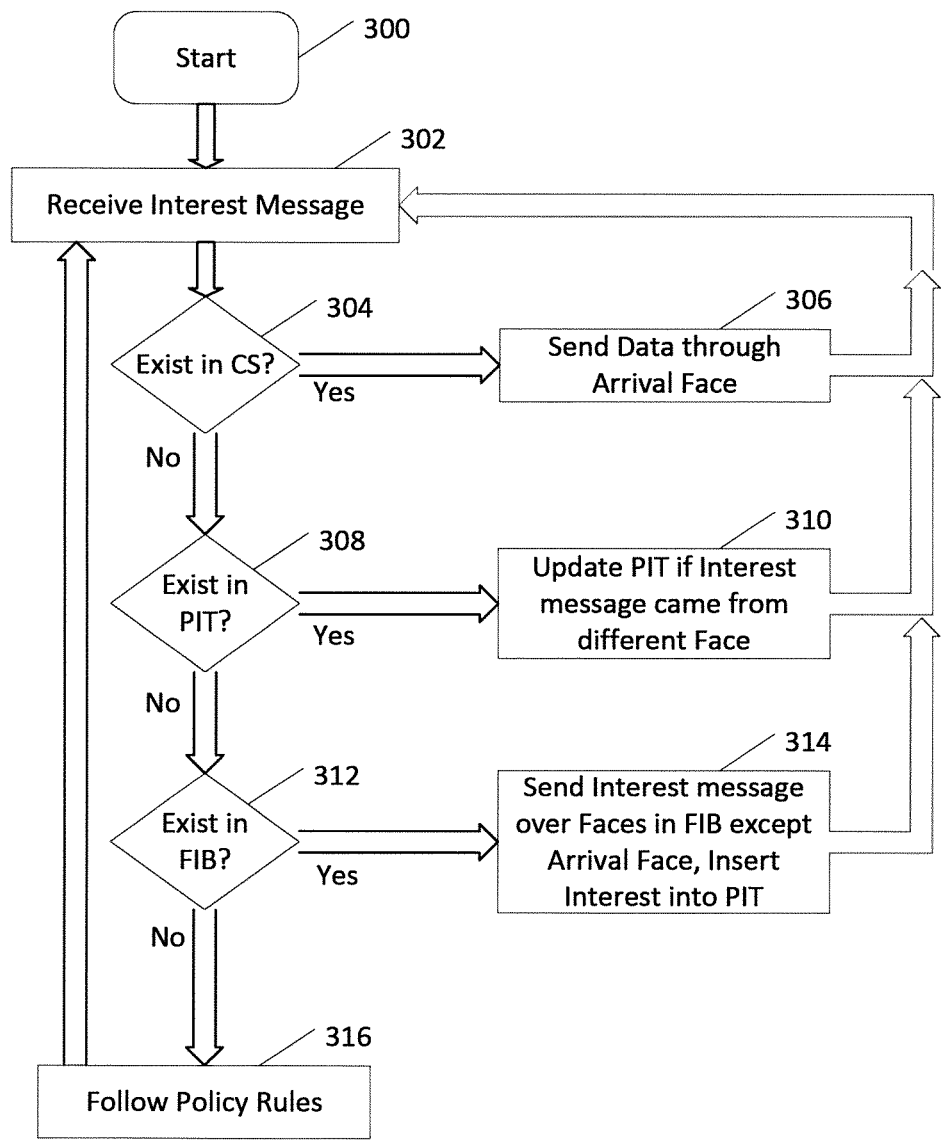
FIG. 3 illustrates a process flow for processing an Interest message at the CCN node device.

FIG. 3 shows a process 300 for handling an Interest Message. When an Interest Message is received at block 302 on an arrival Face 204, a Lookup is performed in CS 202 at block 304. If a matching Content Object is found, it will be transmitted out of the arrival Face 204 at block 306 as a response to the Interest Message. To match, a Content Object must satisfy all of the specifications given in the Interest Message. Multiple Content Objects may simultaneously match in which case the specification in the Interest Message will be used to determine which Content Object to return. When a match is found in CS 202, processing stops and the Interest Message is discarded.

If there is no match at CS 202, a lookup is performed in PIT memory 208 at block 308. If a matching Interest Message is found in PIT memory 208, an equivalent Interest Message has already been forwarded and is pending. The arrival Face 204 of the new Interest Message is added to the list of sources of unsatisfied Interests in PIT memory 208 at block 310 and the Interest Message is discarded.

If there is no match at PIT memory 208, a lookup is performed in FIB memory 206 at block 312. If a matching prefix is found in FIB memory 206, an entry is created in PIT memory 208 identifying the arrival Face 204 of the Interest Message and the message is transmitted according to the strategy rules to one or more of the outbound Faces 204 registered for the prefix in FIB memory 206 at block 314. Note that one of the outbound Faces 204 may actually be connected to a local agent that uses the semantics of the name to dynamically configure new faces.

If no match is found in the previous steps, then the node device has no way to satisfy the Interest Message at present. Policy rules may be followed at block 316 to handle this situation. The Interest Message may be held for a short time before being discarded, and the creation of a new FIB memory 206 entry at block 316 may provide a way to satisfy the Interest Message. As shown above, CCN content names are not interpreted in the operation of the CCN protocol itself, just matched. All assignment of meaning to names or their component parts comes from the application, institution, and/or global conventions reflected in prefix forwarding rules.

Figure 4:
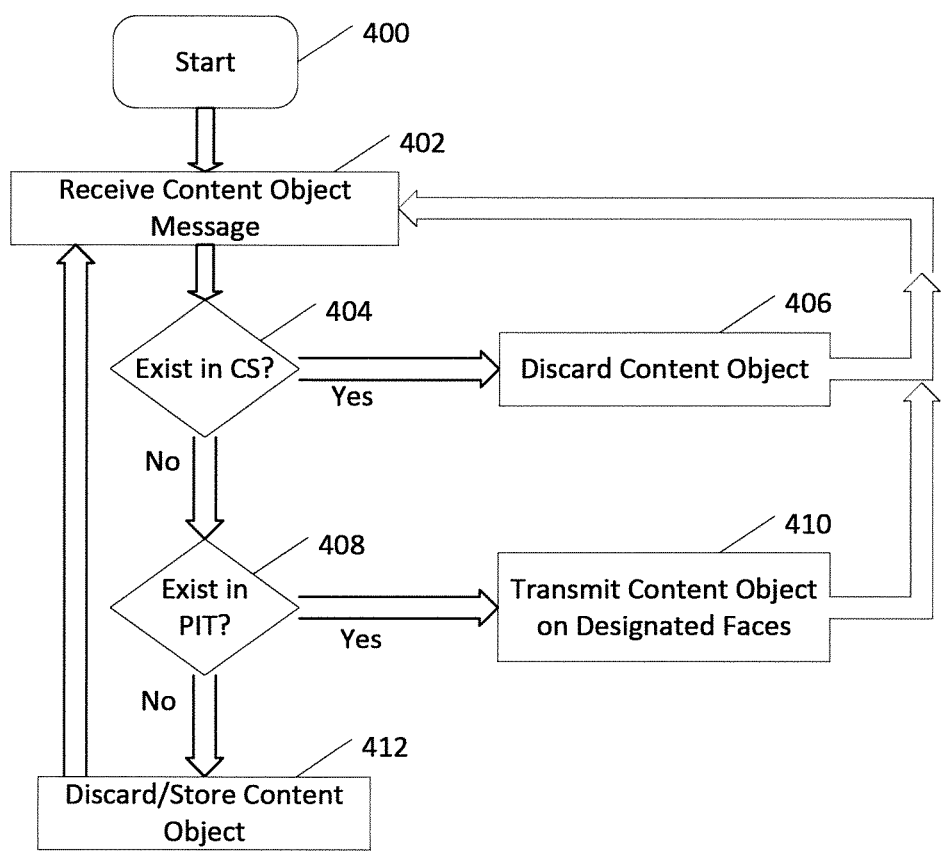
FIG. 4 illustrates a process flow for processing a Content Object message at the CCN node device.

FIG. 4 shows a process 400 for handling Content Object messages. A Content Object message is received at block 402. A lookup is performed in CS 202 at block 404. If a matching Content Object is found it means that the newly arrived Content Object is a duplicate which can safely be discarded at block 406, because any Interest Messages have already been satisfied and new ones will be satisfied out of CS 202.

If there is no match at CS 202, a lookup is performed in PIT memory 208 at block 408. If there is a match in PIT memory 208, the Content Object is transmitted at block 410 on all of the source Faces 204 for the Interests represented in PIT memory 208. A node device may perform verification of the Content Object before forwarding it and may apply various policy restrictions. The content Object is then cached at CS 202.

If no match is found in PIT memory 208, then the content is unsolicited. A node device does not forward unsolicited data. At block 412, the unsolicited data may be discarded or may be stored in CS 202 in case it is subsequently requested.

CCN FIB memory 206 entries may point to multiple next-hop destinations simultaneously. The self-identifying nature of Interest Messages and Content Objects means that loops can be avoided without establishing a spanning tree allowing only one destination for any particular prefix at any particular node device. The possibility of multiple outbound faces means that different strategies may be employed to select among them when forwarding messages. A CCN node device 102 implements some strategy rule, even if it is only to transmit an Interest Message on all listed outbound Faces 204 in sequence. A node device may implement many different strategies. Strategy rules are specified by FIB memory 206 entries. Each FIB memory 206 entry may contain a constrained program for handling the forwarding of Interest Messages addressing the particular prefix.

A node device discards PIT memory 208 entries that have not been refreshed by the arrival of new Interest Messages within some timeout. The new Interests confirm that the potential recipients are still interested in receiving content. A node device retransmits Interest Messages periodically for pending PIT entries. A node device may use different timeouts for refreshing the liveness of received Interest Messages (downstream interests) from those used for retransmitting pending Interest Messages (upstream interests), and may use different timeouts associated for different faces. In this way, each node device matches to both downstream and upstream parties.

The CCN protocol does not have any fixed-length fields. Instead, CCN data formats are defined by XML schemas and encoded with explicitly identified field boundaries. CCN content names are hierarchically-structured, consisting of a number of elements. This design permits field values of arbitrary length, optional fields that consume no packet space when omitted, and nested structures. The use of the XML structure does not imply that field values are text strings nor does it require that messages be encoded as human-readable text. Most fields are defined to contain arbitrary binary values, including those that identify content.

FIG. 5 shows an example of a typical Interest message 500. An Interest message 500 includes at a minimum a Type element and a Content Name element. The Type element identifies the message as an Interest message. The Content Name element represents a hierarchical name for the requested content and is the only required element in an Interest message. The Interest message 500 may include the following selector elements—Name, MinSuffixComponents, MaxSuffixComponents, PublisherPublicKeyDigest, Exclude, ChildSelector, AnswerOriginKind, Scope, InterestLifetime, Nonce, and FaceID. These remaining elements fall into several categories—1) those that further qualify the Content Objects that may match the Interest (MinSuffixComponents, MaxSuffixComponents, PublisherPublicKeyDigest, Exclude), 2) those that limit where the answer might come from (AnswerOriginKind, Scope, InterestLifetime), 3) those that advise the selection of what to send when there are multiple Content Objects that match (ChildSelector), and 4) duplicate suppression (Nonce).

The MinSuffixComponents and MaxSuffixComponents elements are elements that specify limits on a number of name components beyond those in the prefix, and counting the implicit digest, that may occur in the matching ContentObject. The PublisherPublicKeyDigest element is a value that must be equal to the value of the PublisherPublicKey-Digest element of the Content Object for there to be a match. The Exclude element embodies a description of name components that should not appear as a continuation of the Name prefix in the response to the interest. The ChildSelector element provides a way of expressing a preference for which Content Object should be returned when a given interest matches more than one ContentObject within a given content store. The AnswerOriginKind element encodes several bit fields that control the response to the interest. The Scope limits where the Interest may propagate. The InterestLifetime element indicates the (approximate) time remaining before the interest times out. The Nonce element carries a randomly-generated byte string that is used to detect and discard duplicate Interest messages. The FaceID element may be used to specify the desired outgoing face for forwarding the interest.

In the CCN architecture, Interest messages are used to pull data as identified in the message payload. The data being pulled is then cached within the network as appropriate. Being a pull based architecture, a CCN architecture does not naturally support pushing data. An Interest message is not cacheable as it is used to solicit data. Interest messages are typically discarded upon being processed and are not cached in the CCN architecture. However, a typical primitive in an IoT application is a push notification which can be triggered periodically or based on certain events. The present disclosure provides an ability to use an Interest type message to push data in a CCN in support of an IoT application. An ability to push data enhances an IoT application implementation having a variety of sensors that measure certain parameters for availability in the network.

The CCN protocol is designed to pull data within network 100 using an Interest message as shown in FIG. 5 to request data by name and a Content Object message providing the data to the requester in response to the request. However, it may be beneficial for the CCN protocol to push data into network 100 without first requesting the data. In such a scenario, an entity in network 100 may subscribe to receive certain data from a source entity in network 100. By allowing a source of data to push the data through network 100 without first receiving a request for the data, the capabilities of network 100 would greatly expand if the CCN protocol included the ability to autonomously push data.

FIGS. 6A-6C show examples of a special type of Interest message. In FIG. 6A, an Interest-Notification message 600 provides a capability to push data through network 100. Interest-Notification message 600, instead of having a form similar to an Interest message, is a new type of CCN network packet. Interest-Notification message 600 includes a Type element indicating that the message is of the type carrying a cacheable object. Interest-Notification message 600 also includes the Content Name element, the Cacheable Object itself, and security metadata. including a signature for verifying the Cacheable Object. The Content Name element represents a hierarchical name for the Cacheable Object being pushed into network 100. The Cacheable Object element of the Interest-Notification message 600 includes the same fields as a Content Object sent in response to an Interest message and described above. The security metadata data field includes a signature for verifying the Cacheable Object. FIGS. 6B and 6C show another variation of an Interest-Notification message. In FIG. 6B, an Interest-Notification message 602 encapsulates an Interest message with the Cacheable Object being piggybacked or encapsulated therewith. In FIG. 6C, an Interest-Notification message 604 encapsulates a Content Object message with the Cacheable Object being piggybacked or encapsulated therewith. The name in the Interest or the Content Object can be used for routing to the consuming end points, while the name of the Cached-object represents the name under which the producer generates the cached-object.

Figure 7:
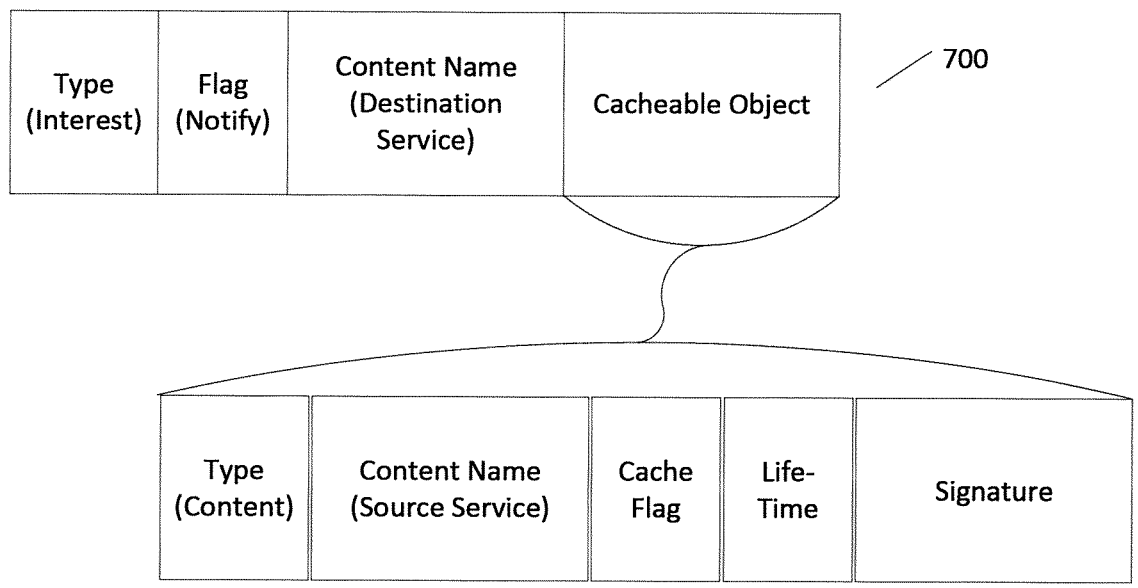
FIG. 7 illustrates an example format of an Interest Notification message.

FIG. 7 shows an alternative example of an Interest-Notification message 700 used to push data in network 100. Interest-Notification message 700 includes the Type element and the Name element as in an Interest message. Interest-Notification message 700 also includes a notification flag identifying the message as containing a cacheable object. Example fields similar to those for a Content Object are shown for the Cacheable Object. In this alternative approach, a current Interest message primitive is used to identify it as an interest-notification message. The processing logic however depends on the value of the notification flag as to whether the message is processed as an Interest message or an Interest-Notification message. For both Interest-Notification messages 600 and 700, the indication therein of a cacheable object initiates different rules than those employed for an Interest message. PIT memory 208 processing is bypassed for the Interest-Notification messages 600 and 700. Interest-Notification messages 600 and 700 are matched against entries in FIB memory 206 to determine where to route the Interest-Notification messages 600 and 700.

Figure 8:
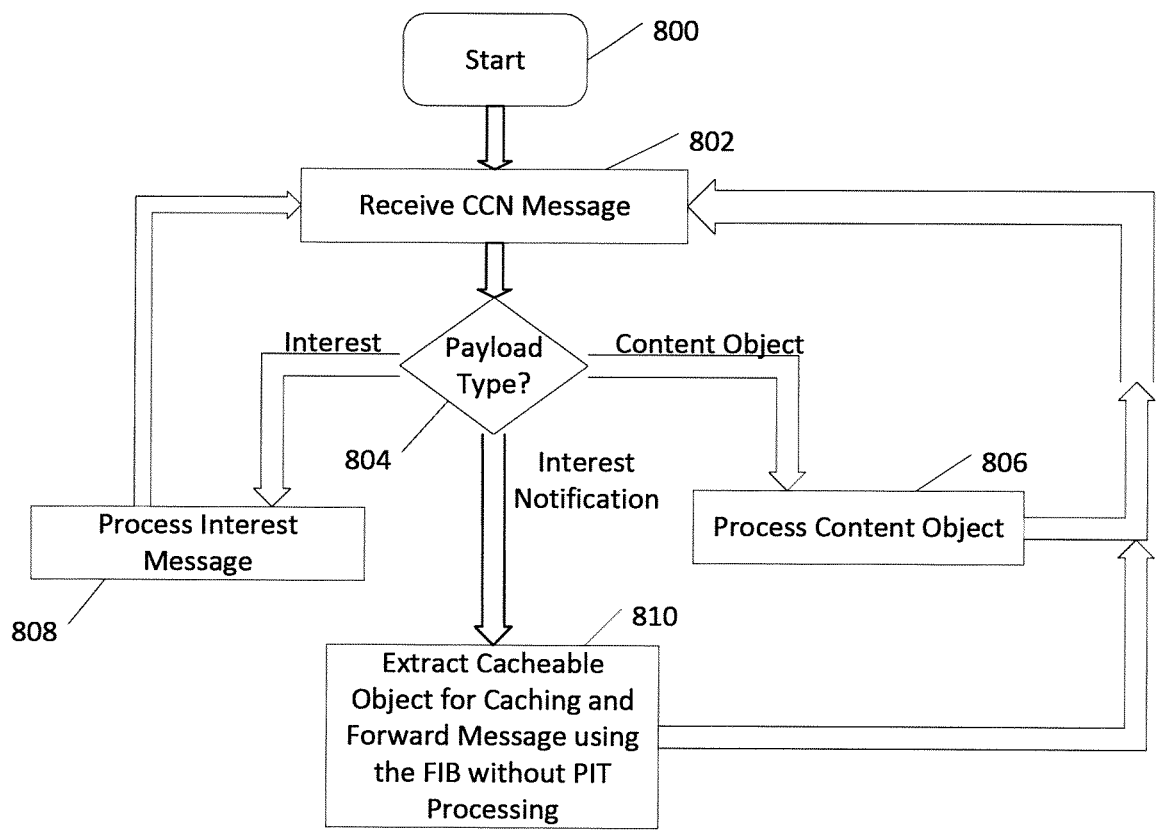
FIG. 8 illustrates a process flow for processing any of an Interest message, an Interest Notification message, and a Content Object message at the CCN node device.

FIG. 8 shows a process 800 in evaluating messages received in network 100. Process 800 may be performed by any entity within network 100 implementing the CCN protocol. Process 800 begins at block 802 upon receipt of a CCN message at a CCN node device 102. The message is checked for payload type at block 804. If the message is a Content Object message, the message is processed at block 806 as described above. If the message is an Interest message, the message is processed at block 808 as described above. If the message is an Interest-Notification message, the message is processed at block 810 as a regular Interest message as needed with the only exception being that the Interest-Notification message is not included in PIT memory 208 processing. In addition, the cacheable object included in the message is extracted at block 810 for caching at the CCN node device 102. The cacheable object then becomes available for retrieval by a normal Interest message. The Interest-Notification message is then forwarded to other CCN node devices 102 based on information in FIB memory 206 to endpoints subscribing to the cacheable object.

Figure 9:
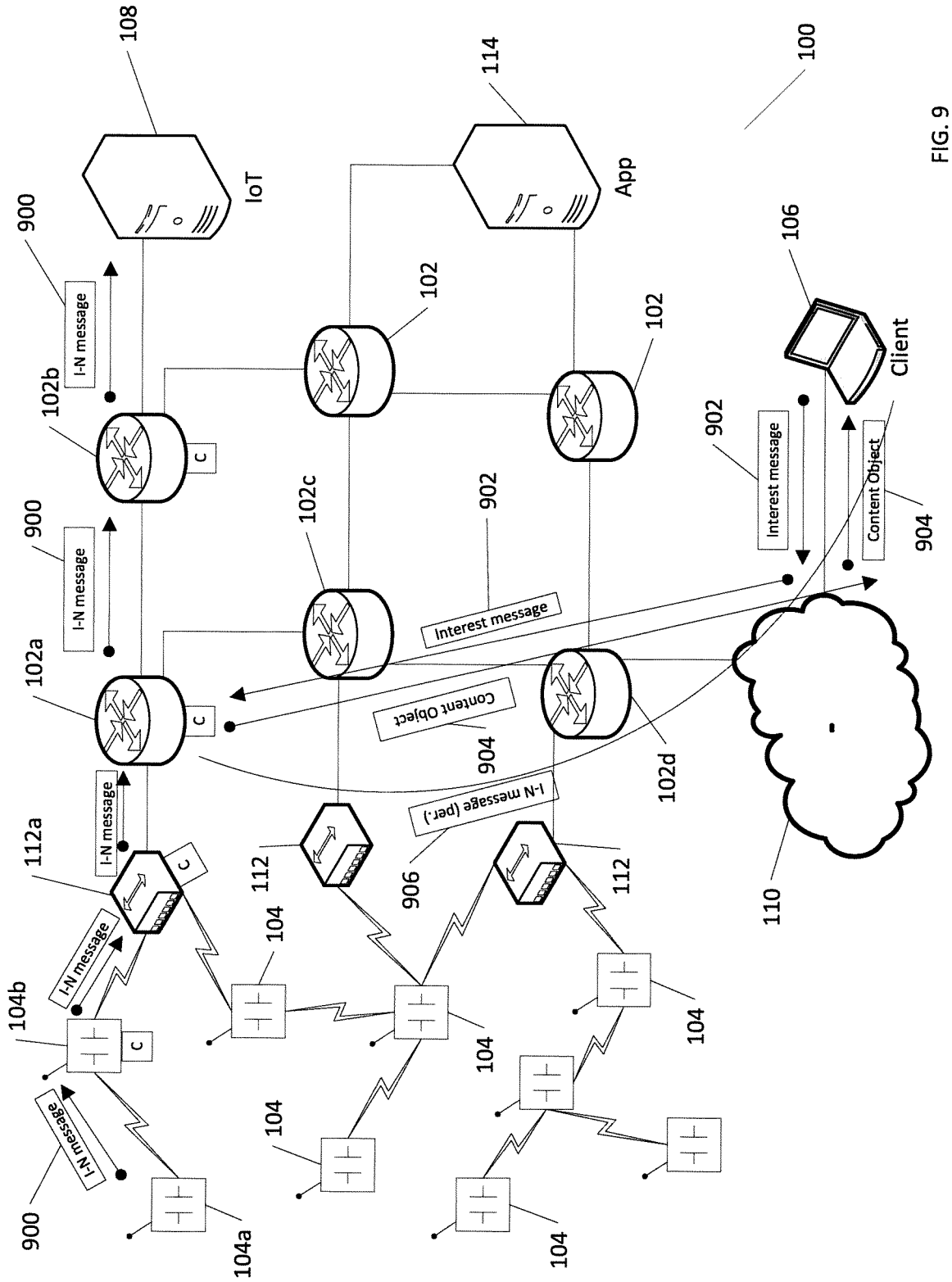
FIG. 9 illustrates a network diagram showing message flow therein.

FIG. 9 shows the routing of an Interest-Notification message 900 in network 100. Sensor 104a generates a cacheable object for placement in Interest-Notification message 900. The Interest-Notification message is routed (pushed) through network 100 to IoT server 108. Each entity in network 100 processes the Interest-Notification message 900 and determines whether the cacheable object is to be cached locally and whether the Interest-Notification message is to be forwarded in accordance with the FIB memory 206 processing. The cacheable object may be cached anywhere in network 100, including in one or more of other sensors 104, sink element 112, and CCN node devices 102. In the example shown in FIG. 9, the Interest-Notification message 900 is forwarded to IoT server 108 with the cacheable object being cached at one or more of sensor 104b, sink element 112a, CCN node device 102a, and CCN node device 102b.

With the cacheable object cached somewhere in network 100, an application or other entity, such as client 106, may send a regular Interest message 902 to request (pull) the cacheable object as desired. In the example shown in FIG. 9, Interest message 902 is forwarded through Internet 110, CCN node device 102d, and CCN node device 102c for processing by CCN node device 102a. CCN node device 102a generates a Content Object message 904 including the cacheable object for return to client 106. In addition, IoT server 108 may subscribe to a continuous stream of notifications. In such a scenario, client 106 may request (pull) the data as desired. Alternatively, client 106 may subscribe to receiving periodic notifications instead of a continuous stream. FIB memory 206 at CCN node device 102a may be configured to send continuous Interest-Notification messages 900 to IoT server 108 and send periodic Interest-Notification messages 906 to client 106 without having client 106 pull the data.

As shown above, in addition to the cacheable object, Interest-Notification messages 600 and 700 include attributes to manage storing the cacheable object in the network. These attributes include a cache flag and a content lifetime. The cache flag indicates whether the cacheable object is to be cached in network 100. In some instances, the data being pushed in network 100 is latency sensitive and thus may not require caching. In other instances, the data being pushed in network 100 need only be cached for a certain period of time. The content lifetime attribute indicates how long the cacheable object is valid when cached in CS 202. The cache flag and content lifetime attributes provide an ability to control caching of the cacheable object.

There are several other considerations to take into account when caching cacheable objects. A stream of Interest-Notification messages may be sent from many sources in the network. The caching of the cacheable objects may overwhelm the available cache memory. To combat this, cacheable objects may be differentiated from content objects such that cacheable objects are removed and replaced in a cache more frequently than content objects. If the cache is full, a new cacheable object may be entered into the cache using a first-in-first-out, least recently used, or other priority scheme just for the cacheable objects. Another technique is to logically partition the cache into a cacheable object section and a content object section. New cacheable objects are placed into and old cacheable objects are removed from the cacheable object section only of the cache with no impact on the content objects in the cache.

Figure 10:
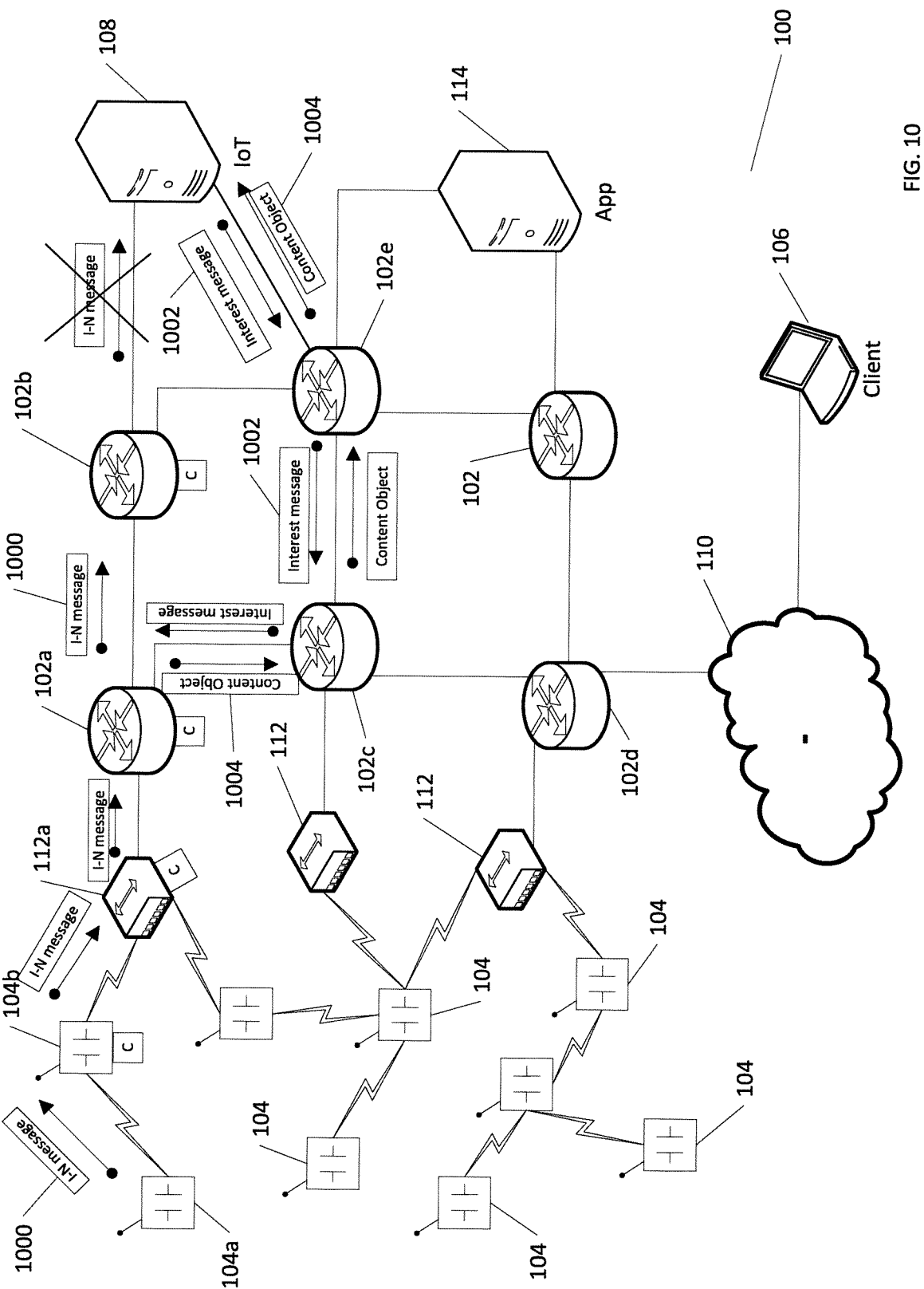
FIG. 10 illustrates a network diagram showing a message flow therein during a failure.

FIG. 10 shows the benefits of an Interest-Notification message within network 100. An Interest-Notification message may identify failed links within network 100. In the example of FIG. 10, IoT server 108 expects to receive an Interest-Notification message 1000. However, expected Interest-Notification message 1000 was not received at IoT server 108. This non-receipt may be a result of a failed link between IoT server 108 and CCN node device 102b or a failure within CCN node device 102b. Upon determining that IoT server 108 has not received Interest-Notification message 1000, for example after a time out or receipt of an out of sequence Interest-Notification message, IoT server 108 may generate an Interest message 1002 to request the cacheable object from the missing Interest-Notification message. Interest message 1002 propagates through CCN node devices 102e and 102c until it reaches CCN node device 102a where the cacheable object is cached. CCN node device 102a generates a Content Object message 1004 including the missing cacheable object for return back through CCN node devices 102c and 102e to IoT server 108. Information concerning the lack of receipt of Interest-Notification message 1000 can be sent back through network 100 for remedial action.

Figure 11:
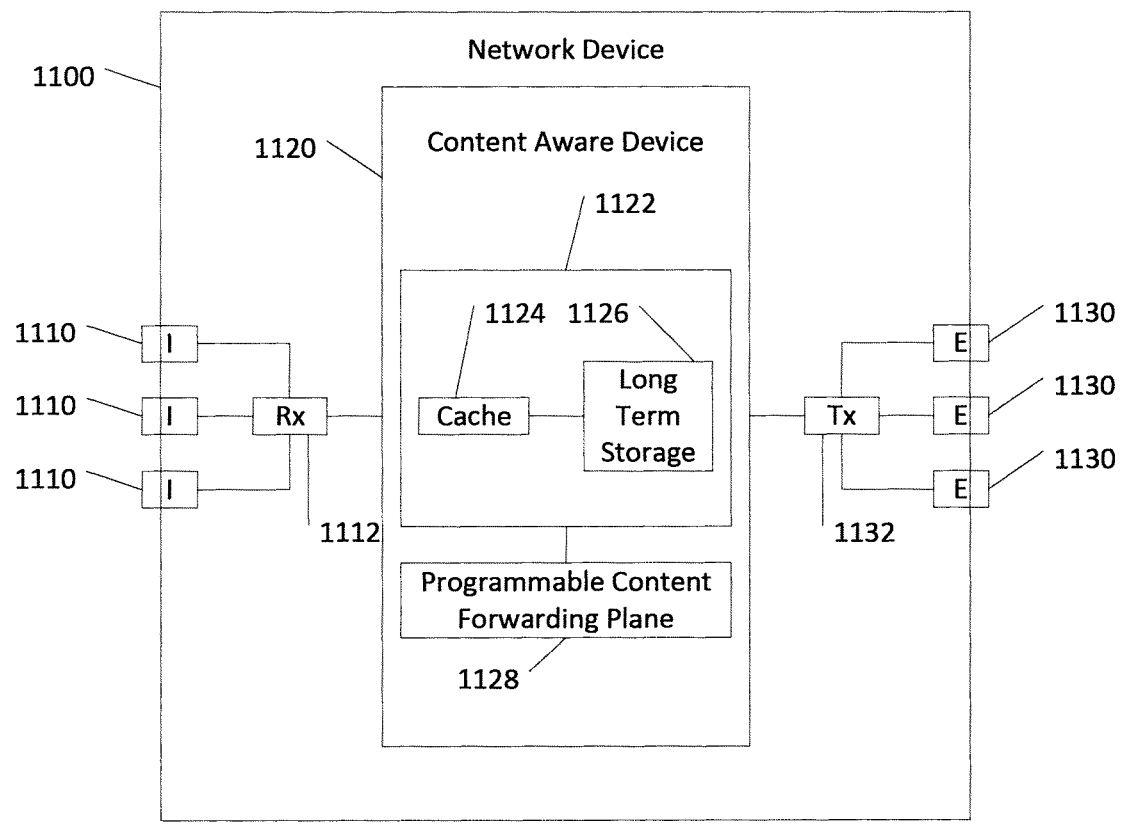
FIG. 11 illustrates a diagram of a network device which may be any device that transports and processes data through the network.

FIG. 11 illustrates an embodiment of a network device 1100, which may be any device that transports and processes data through network 100, including through the SDN ICN switch according to the present disclosure. For instance, the network device 1100 may correspond to or may be located in any of the CCN node devices 102 described above, or any other entity within network 100. The network device 1100 may also be configured to implement or support the schemes and methods described above. The network device 1100 may comprise one or more ingress ports or devices 1110 coupled to a receiver (Rx) 1112 for receiving signals and frames/data from other network components. The network device 1100 may comprise a content aware device 1120 to determine which network components to send content to. The content aware device 1120 may be implemented using hardware, software, or both. The network device 1100 may also comprise one or more egress ports or devices 1130 coupled to a transmitter (Tx) 1132 for transmitting signals and frames/data to the other network components. The receiver 1112, content aware device 1120, and transmitter 1132 may also be configured to implement at least some of the disclosed schemes and methods above, which may be based on hardware, software, or both. The components of the network device 1100 may be arranged as shown in FIG. 11 or arranged in any other configuration.

The content aware device 1120 may also comprise a programmable content forwarding plane block 1128 and one or more storage blocks 1122 that may be coupled to the programmable content forwarding plane block 1128. The programmable content forwarding plane block 1128 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware device 1120 or the network device 1100. The programmable content forwarding plane block 1128 may interpret user requests for content and accordingly fetch content, e.g., based on meta-data and/or content name (prefix), from the network or other content routers and may store the content, e.g., temporarily, in the storage blocks 1122. The programmable content forwarding plane block 1128 may then forward the cached content to the user. The programmable content forwarding plane block 1128 may be implemented using software, hardware, or both and may operate above the IP layer or L2.

The storage blocks 1122 may comprise a cache 1124 for temporarily storing content, such as content that is requested by a subscriber. Additionally, the storage blocks 1122 may comprise a long-term storage 1126 for storing content relatively longer, such as content submitted by a publisher. For instance, the cache 1124 and the long-term storage 1126 may include Dynamic random-access memories (DRAMs), solid-state drives (SSDs), hard disks, or combinations thereof.

Figure 12:
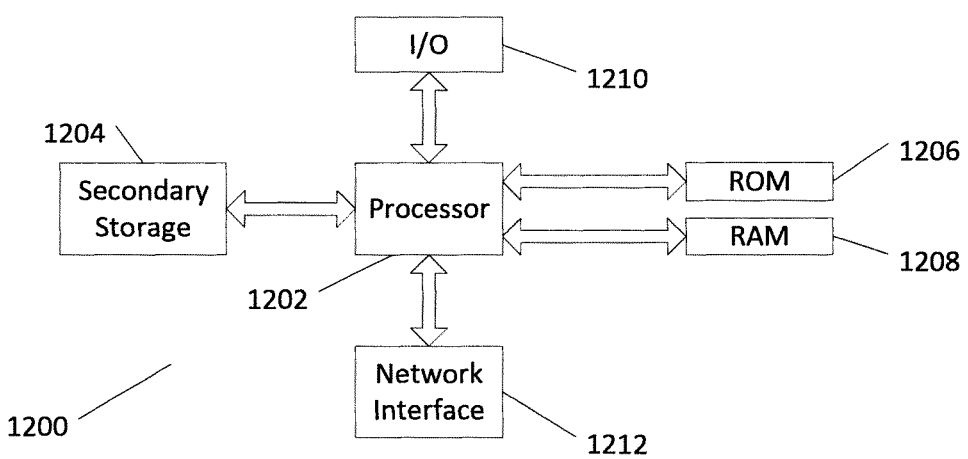
FIG. 12 illustrates a diagram of network components within a network device

FIG. 12 illustrates a typical, general-purpose network component 1200 suitable for implementing one or more embodiments of the components disclosed herein. The network components described above may be implemented on any general-purpose network component, such as a computer or network component with sufficient processing power, memory resources, and network throughput capability to handle the necessary workload placed upon it. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

In summary, when requested by name, CCN delivers named content to the user from the nearest cache, traversing fewer network hops, eliminating redundant requests, and consuming less resources overall. As described above, CCN can now be used to push data in the network for storage in caches and to accommodate subscriptions for the data. Data pushed into the network may be distinguished from data requested in the network. A variation to the request message, an Interest-Notification message, is used to send unsolicited data into the network. The use of the described Interest-Notification message provides a capability to implement IoT applications in a CCN environment In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method for pushing data in a Content-Centric Networking (CCN) network, the method comprising:

receiving a message from a source at an input interface of a node device in the CCN network, the message based on a CCN protocol, wherein a content object in the CCN protocol is represented according to one or more fields;

determining that the message is received as an interest-notification message according to a Type field, a Content Name field, and a Cacheable Object field included in the message, the Type field indicating that the received message is for pushing data within the CCN network, the Content Name field associating a hierarchical name to the data being pushed within the CCN network, the Cacheable Object field including the one or more fields for a cacheable object representing the data being pushed within the CCN network;

extracting the cacheable object from the received message in response to the received message determined to be the interest-notification message; and placing the cacheable object from the received message in a cache at the node device for retrieval by an interest message.

2. The method of claim 1, further comprising:
processing the interest-notification message as a push-type message and bypassing pending interest processing; and
forwarding the interest-notification message to an output interface using a forward information base memory in response to the processing.

3. The method of claim 1, further comprising:
determining that the received message is an interest message requesting a content object;
determining whether the content object is cached at the node device; and
providing the content object to the source in response to the content object being cached at the node device.

4. The method of claim 3, wherein the content object is a cacheable object previously placed in the cache at the node device by the interest-notification message.

5. The method of claim 4, further comprising:
distinguishing, in the cache, content objects requested by an interest message from cacheable objects provided in the interest-notification message.

6. The method of claim 1, wherein the interest-notification message is a new type of CCN network message including an interest message Type field and a flag field indicating that the CCN network message contains the cacheable object.

7. The method of claim 1, wherein the interest-notification message pushes data to one or more node devices in the CCN network without the data being first requested by the one or more node devices.

8. The method of claim 1, wherein the interest-notification message includes a lifetime field indicating how long the cacheable object is valid in the cache.

9. The method of claim 1, wherein the interest-notification message includes a cache flag field indicating whether the cacheable object is to be cached in the cache.

10. The method of claim 1, wherein the interest-notification message encapsulates any one of an interest message and a content object with the cacheable object.

11. A method for pushing data in a Content-Centric Networking (CCN) network, the method comprising:
receiving a message from a source at an input interface of a node device in the CCN network, the message based on a CCN protocol, wherein a content object in the CCN protocol is represented according to one or more fields;

determining that the message is received as an interest-notification message according to a Type field, a Content Name field, and a Cacheable Object field included in the message, the Type field indicating that the received message is for pushing data within the CCN network, the Content Name field associating a hierarchical name to the data being pushed within the CCN network, the Cacheable Object field including the one or more fields for a cacheable object representing the data being pushed within the CCN network;

extracting the cacheable object from the received message in response to the received message determined to be the interest-notification message; and placing the cacheable object in a cache at the node device for retrieval by an interest message.

12. The method of claim 11, further comprising:
processing the interest-notification message as a push-type message and bypassing pending interest processing.

13. An apparatus for pushing data in a Content-Centric Networking (CCN) network, the apparatus comprising:
an input interface configured to receive a message from a source, the message based on a CCN protocol, wherein a content object in the CCN protocol is represented according to one or more fields;
a memory configured to store data and instruction code;
a processor, upon executing the instruction code, configured to:
determine that the message is received as an interest-notification message according to a Type field, a Content Name field, and a Cacheable Object field included in the message, the Type field indicating that the received message is for pushing data within the CCN network, the Content Name field associating a hierarchical name to the data being pushed within the CCN network, the Cacheable Object field including the one or more fields for a cacheable object representing the data being pushed within the CCN network,
extract the cacheable object from the received message in response to the received message determined to be the interest-notification message; and
a content store configured to receive and cache the cacheable object for retrieval by an interest message.

14. The apparatus of claim 13, further comprising:
a forwarding information base memory configured to identify whether the interest-notification message is to be further forwarded in the CCN network;
wherein the processor is further configured to:
process the interest-notification message as a push-type message and bypassing pending interest processing; and
forward the interest-notification message to an output interface as identified by the forwarding information base memory.

15. The apparatus of claim 13, wherein the processor is further configured to:
determine that the received message is an interest message requesting a content object;
determine whether the content object is cached in the content store; and
provide the content object from the content store in response to the content object being cached in the content store.

16. The apparatus of claim 15, wherein the content object is a cacheable object from the interest-notification message previously placed in the content store.

17. The apparatus of claim 16, wherein the content store distinguishes content objects requested by an interest message from cacheable objects included in the interest-notification message pushed in the CCN network.

18. The apparatus of claim 13, wherein the interest-notification message is a CCN network message including an Interest message Type field and a flag field indicating that the CCN network message includes a cacheable object.

19. The apparatus of claim 13, wherein the interest-notification message includes a lifetime field indicating how long the cacheable object is valid in the content store.

20. The apparatus of claim 13, wherein the interest-notification message includes a cache flag field indicating whether the cacheable object is to be cached in the content store.

21. The apparatus of claim 13, wherein the interest-notification message encapsulates any one of an interest message and a content object with the cacheable object.

\* \* \* \* \*